United States Patent
Grady et al.

(10) Patent No.: US 8,224,093 B2
(45) Date of Patent: Jul. 17, 2012

(54) SYSTEM AND METHOD FOR IMAGE SEGMENTATION USING CONTINUOUS VALUED MRFS WITH NORMED PAIRWISE DISTRIBUTIONS

(75) Inventors: Leo Grady, Yardley, PA (US); Dheeraj Singaraju, Baltimore, MD (US); René Vidal, Baltimore, MD (US)

(73) Assignee: Siemens Aktiengesellschaft, München (DE)

( * ) Notice: Subject to any disclaimer, the term of this patent is extended or adjusted under 35 U.S.C. 154(b) by 507 days.

(21) Appl. No.: 12/558,649

(22) Filed: Sep. 14, 2009

(65) Prior Publication Data
US 2010/0104186 A1   Apr. 29, 2010

Related U.S. Application Data

(60) Provisional application No. 61/107,712, filed on Oct. 23, 2008.

(51) Int. Cl.
G06K 9/34 (2006.01)
(52) U.S. Cl. ........................ 382/180; 382/173
(58) Field of Classification Search .................. 382/173, 382/180
See application file for complete search history.

(56) References Cited

U.S. PATENT DOCUMENTS

2008/0056577 A1* 3/2008 Grady et al. ............... 382/180
2008/0247646 A1* 10/2008 Chefd'hotel et al. ....... 382/173
2008/0310716 A1* 12/2008 Jolly et al. ................. 382/173
2009/0060333 A1* 3/2009 Singaraju et al. .......... 382/173
2009/0097727 A1* 4/2009 Jolly et al. ................. 382/131

OTHER PUBLICATIONS

Grady et al., "Three interactive graph-based segmentation methods applied to cardiovascular imaging" in O.F. Nikos Paragios, Yunmei Chen, editor, Handbook of Mathematical Models in Computer Vision, pp. 453-469, Springer, 2006.*
Sinop et al., "A seeded image segmentation framework unifying graph cuts and random walker which yields a new algorithm," ICCV 2007, Oct. 2007.*

* cited by examiner

Primary Examiner — Anand Bhatnagar
Assistant Examiner — Soo Park
(74) Attorney, Agent, or Firm — Donald B. Paschburg; F. Chau & Associates, LLC

(57) ABSTRACT

A method for segmenting a digital image includes initializing object and background seed nodes in an image, where the image is represented as a graph G=(V, E) whose nodes i∈V correspond to image points and whose edges e∈E connect adjacent points, where set M⊂V contains locations of nodes marked as seeds, set U⊂V contains locations of unmarked nodes, set O⊂M contains locations of object seed nodes, and set B⊂M contains locations of background seed nodes, assigning to each seed node a membership value such that ∀i∈O,$x_i$=1 and ∀i∈B,$x_i$=0, where each node i∈V is associated with a membership $x_i$∈[0,1], and finding a membership vector x∈$\Re^{|V|}$, whose $i^{th}$ entry is given by $x_i$ that minimizes $$E_p(x) = \sum_{e_{ij} \in E} w_{ij}|x_i - x_j|^{p_{ij}},$$

where each edge $e_{ij}$∈E connecting nodes i and j in V is associated with a weight $w_{ij}$ and an exponent $p_{ij}$, and ∀$e_{ij}$∈E, 1≤$p_{ij}$<∞, such that $x_i$=1 if i∈O and $x_i$=0 if i∈B.

14 Claims, 5 Drawing Sheets

| $p$ | BE | RI | GCE | VoI | Avg. rank |
|---|---|---|---|---|---|
| 1. | 3.276 | 0.970 | 0.028 | 0.196 | 5 |
| 1.25 | 3.241 | 0.971 | 0.028 | 0.193 | 4 |
| 1.5 | 3.214 | 0.972 | 0.027 | 0.189 | 3 |
| 1.75 | 3.206 | 0.972 | 0.027 | 0.187 | 2 |
| 2 | 3.206 | 0.972 | 0.026 | 0.185 | 1 |

Table 1

| $p$ | BE | RI | GCE | VoI | Avg. rank |
|---|---|---|---|---|---|
| 1. | 8.713 | 0.916 | 0.393 | 0.068 | 1.25 |
| 1.25 | 11.184 | 0.908 | 0.408 | 0.067 | 2.5 |
| 1.5 | 11.487 | 0.907 | 0.406 | 0.067 | 2.25 |
| 1.75 | 12.292 | 0.904 | 0.417 | 0.069 | 4 |
| 2 | 12.727 | 0.900 | 0.432 | 0.071 | 5 |

Table 2

SYSTEM AND METHOD FOR IMAGE SEGMENTATION USING CONTINUOUS VALUED MRFS WITH NORMED PAIRWISE DISTRIBUTIONS

CROSS REFERENCE TO RELATED UNITED STATES APPLICATIONS

This application claims priority from "P-brush: A Generalized Algorithm for Interactive Image Segmentation", U.S. Provisional Application No. 61/107,712 of Grady, et al., filed Oct. 23, 2008, the contents of which are herein incorporated by reference in their entirety.

TECHNICAL FIELD

This disclosure is directed to methods for object segmentation in digitized images.

DISCUSSION OF THE RELATED ART

Object segmentation is an important part of scene understanding and interpretation, which involves finding the regions of the image that correspond to an object. Alternatively, it can be posed as the task of finding the boundaries of the object in the image. Object segmentation is an intrinsically ill-posed task, because a scene could contain several objects. Hence, determining what constitutes an object of interest could be ambiguous. Such ambiguities can be resolved by allowing the user to interact with the algorithm and provide information about the object of interest.

One subset of interactive segmentation algorithms takes as input a partial labeling of the pixels and produces a complete labeling of the pixels. This subset includes seeded algorithms that input a set of pixels as belonging to an object and a disjoint set of pixels as belonging to background. These seeds are referred to as scribbles. The goal of the algorithm is to output a labeling of every pixel into one of these two categories.

Seeded segmentation algorithms include the Graph Cuts, Random Walker and shortest path algorithms. These methods typically construct a graph such that each node in the graph corresponds to a pixel in the image. Neighboring nodes are connected by edges that are assigned non-negative weights. These weights are decreasing functions of the difference between the intensities, colors or other features of the nodes (pixels) connected by the edges. The labels are then estimated by minimizing an energy function defined on this graph, subject to the constraints enforced by the scribble.

The Graph Cuts estimates the labeling by finding the minimum cut between the foreground and background seeds via a maximum flow computation. Two concerns in the literature about the original Graph Cuts algorithm are metrication error (blockiness) and the shrinking bias (bias towards shorter boundaries). Subsequent work has addressed the metrication error and the shrinking, but at the expense of additional parameters, memory or computation.

The Random Walker algorithm assigns each unlabeled pixel to the seed for which there is a minimum diffusion distance. The effect of using the diffusion distance for labeling is that weak or noisy boundaries do not cause bleeding of the segmentation or a shrinking bias. However, the segmentation boundary is more strongly affected by the seed location, an effect known as the proximity bias.

Shortest path algorithms assign each pixel to the foreground if there is a shorter path on the weighted graph from that pixel to a foreground seed than to any background seed. Shortest paths algorithm are fast and can prevent shrinking bias. However, a single good path is sufficient for connectivity, thus these algorithms exhibit much stronger proximity bias than the Random Walker and Graph Cuts, and are more likely to leak through weak boundaries. Shortest path algorithms also exhibit metrication artifacts on a 4-connected lattice.

The aforementioned segmentation strategies have been shown to be special cases of a single more general algorithm. This general algorithm attempts to find a potential function with a minimum spatial gradient, subject to Dirichlet boundary conditions given at the seeds. The algorithm proceeds by minimizing the p-norm of the gradient and it was shown that p=1 gives the Graph Cuts algorithm, p=2 gives the Random Walker algorithm and p=∞ gives the shortest path algorithm. Specialized algorithms can minimize the p-norm for each of these three values of p, but this specialization precludes the ability to merge algorithms or employ the generalized algorithm with a p value not equal to 1, 2 or ∞, since no algorithm is given for minimizing an arbitrary p-norm. However, when $p \geq 1$, the objective energy is convex and therefore one would expect to find a global optimum.

SUMMARY OF THE INVENTION

Exemplary embodiments of the invention as described herein generally include methods and systems for image segmentation using continuous-valued Markov Random Fields (MRFs) with probability distributions following the p-norm of the difference between configurations of neighboring sites. A cost function according to an embodiment of the invention for $p \geq 1$ allows the use of different norms for the spatial gradients at different nodes in the constructed graph. Hence a framework according to an embodiment of the invention admits hybrid combinations of algorithms such as Graph Cuts and the Random Walker for 1<p<2. For p=1 these MRFs may be interpreted as the standard binary MRF used by Graph Cuts, while for p=2 these MRFs may be viewed as Gaussian MRFs employed by the Random Walker algorithm. Allowing the probability distribution for neighboring sites to take any arbitrary p-norm ($p \geq 1$), paves the path for hybrid extensions of these algorithms. According to an embodiment of the invention, Iterative Reweighted Least Squares (IRLS) techniques are used to find the global minimizer of the cost function by solving a series of $l_2$ optimizations. These techniques can be used to solve the Graph Cuts and the Random Walker algorithms. Furthermore, a method according to an embodiment of the invention is applicable to images defined on 2D, 3D and higher dimensional grids, and also can be applied to any collection of pixels, not even arranged on a grid, such as ultrasound acquisitions.

Experiments are presented on synthetic images and an extensive database of 50 real images. These experiments show that the use of a fractional p (1<p<2) can address the aforementioned challenges of Graph Cuts and the Random Walker algorithms. More specifically, experiments show that an intermediate value between $1.25 \leq p \leq 1.5$ provides a segmentation algorithm that avoids the known challenges of Graph Cuts and Random Walker. The solver is provably convergent only for 1<p<3, but convergence issues for $p \geq 3$ can be resolved by taking adaptive step sizes as opposed to a fixed step size.

According to an aspect of the invention, there is provided a method for segmenting a digital image, the method including initializing object and background seed nodes in an image, where the image is represented as a graph G=(V, E) whose nodes i∈V correspond to image points and whose edges e∈E connect adjacent points, where set M⊂V contains locations of nodes marked as seeds, set U⊂V contains locations of unmarked nodes, set O⊂M contains locations of object seed nodes, and set B⊂M contains locations of background seed nodes, assigning to each seed node a membership value such that $\forall i \in O, x_i=1$ and $\forall i \in B, x_i=0$, where each node $i \in V$ is associated with a membership $x_i \in [0,1]$, and finding a membership vector $x \in \mathfrak{R}^{|V|}$, whose $i^{th}$ entry is given by $x_i$ that minimizes $$E_p(x) = \sum_{e_{ij} \in E} w_{ij} |x_i - x_j|^{p_{ij}},$$

where each edge $e_{ij} \in E$ connecting nodes i and j in V is associated with a weight $w_{ij}$ and an exponent $p_{ij}$, and $\forall e_{ij} \in E$, $1 \leq p_{ij} < \infty$, such that $x_i=1$ if $i \in O$ and $x_i=0$ if $i \in B$.

According to a further aspect of the invention, the membership $x_i$ of an unmarked node $i \in U$ takes the value $$x_i = \underset{x_i}{\operatorname{argmin}} \left( \sum_{j \in N_i} w_{ij} |x_i - x_j|^{p_{ij}} \right),$$

where $N_i$ is a set of all nodes j that share an edge $e_{ij}$ with node i.

According to a further aspect of the invention, the image comprises a plurality of intensities associated with an N-dimensional grid of points.

According to a further aspect of the invention, the image comprises a plurality of vectors associated with an N-dimensional grid of points.

According to a further aspect of the invention, the image comprises a plurality of intensities associated with collection of points.

According to a further aspect of the invention, $$E_p(x) = \sum_{e_{ij} \in E} w_{ij} |x_i - x_j|^{p_{ij}}$$

is minimized using an iteratively reweighted least squares algorithm.

According to a further aspect of the invention, nodes i with potential $x_i > 0.5$ are assigned to the object, and the remaining to background.

According to another aspect of the invention, there is provided a method for segmenting a digital image, the method including initializing object and background seed nodes in an image, where the image is represented as a graph G=(V, E) whose nodes $i \in V$ correspond to image points and whose edges $e_{i,j} \in E$ connect adjacent nodes $i, j \in V$, where set M⊂V contains locations of nodes marked as seeds, set U⊂V contains locations of unmarked nodes, set O⊂M contains locations of object seed nodes, and set B⊂M contains locations of background seed nodes, assigning to each seed node a potential value such that $\forall i \in O, x_i=1$ and $\forall i \in B, x_i=0$, where each node $i \in V$ is associated with a potential value $x_i$, and a membership vector $x \in \mathfrak{R}^{|V|}$ is defined whose $i^{th}$ entry is given by $x_i$, initializing a potential value of each unmarked node $x_i$, $i \in U$, to 0, iterating a potential value for the set of unmarked nodes $x_U = \{x_i\}_{i \in U}$ according to $x_U^{(n+1)} = -L_U^{-1}(W^{(n)}) x_M$ until convergence, where a superscript (n) indicates a current iteration,
(n+1) indicates a next iteration, $x_M = \{x_i\}_{i \in M}$ is a set of potential values for the marked nodes, $W^{(n)}$ is a weight matrix defined as $$W_{ij}^{(n)} = \begin{cases} p_{ij} w_{ij} |x_i^{(n)} - x_j^{(n)}|^{p_{ij}-2} & \text{if } e_{ij} \in E, x_i^{(n)} \neq x_j^{(n)}, \\ \alpha^{p_{ij}-2} & \text{if } e_{ij} \in E, x_i = x_j, \\ 0 & \text{otherwise,} \end{cases}$$

where $\forall e_{ij} \in E, 1 \leq p_{ij} < \infty$, $w_{ij} = \exp(-\beta \|I_i - I_j\|^2)$, where $\beta > 0$ and $I_i$ is an image value, $\alpha$ is a predefined constant, $L_U^{-1}(W^{(n)})$ is an inverse of a matrix $L_u(W^{(n)})$ where $L_u(W^{(n)})$ and $B(W^{(n)})$ are defined by decomposing a Laplacian matrix L(W) defined by $$L_{ij} = \begin{cases} -w_{ij}, & \text{if } i \neq j, e_{ij} \in E, \\ 0, & \text{if } i \neq j, e_{ij} \notin E, \\ \sum_{j=1, j \neq i}^{|V|} w_{ij}, & \text{if } i = j, \end{cases}$$

as $x^T L(W) x = \begin{bmatrix} x_U & x_M \end{bmatrix} \begin{bmatrix} L_U(W) & B(W) \\ B^T(W) & L_M(W) \end{bmatrix} \begin{bmatrix} x_U \\ x_M \end{bmatrix};$ and assigning nodes i with potential $x_i^{(n+1)}$ greater than a predetermined value to the object, and the remaining nodes to the background.

According to a further aspect of the invention, nodes i with potential $x_i^{(n+1)} > 0.5$ are assigned to the object, and the remaining to background.

According to a further aspect of the invention, iterating a potential value for the set of unmarked nodes $x_U = \{x_i\}_{i \in U}$ converges when $|x_U^{(n+1)} - x_U^{(n)}| \leq \delta$, where $\delta$ is a predetermined constant where $\delta > 0$ and $\delta \ll 1$.

According to a further aspect of the invention, $\alpha > 0$ and $\alpha \ll 1$.

According to a further aspect of the invention, the image comprises a plurality of intensities associated with an N-dimensional collection of points.

According to a further aspect of the invention, the image comprises a plurality of vectors associated with an N-dimensional collection of points.

According to a further aspect of the invention, $p_{ij}=p$ for all edges $e_{ij} \in E$.

According to an aspect of the invention, there is provided a program storage device readable by a computer, tangibly embodying a program of instructions executable by the computer to perform the method steps for segmenting a digital image.

BRIEF DESCRIPTION OF THE DRAWINGS

FIGS. 7(a)-(f) depict examples of testing using the rectangle/skeleton as scribbles, according to an embodiment of the invention.

DETAILED DESCRIPTION OF EXEMPLARY EMBODIMENTS

Figure 1:
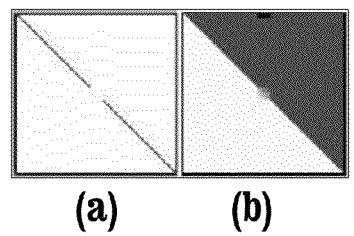
FIGS. 1(a)-(b) depict the effect increasing p on metrication error, according to an embodiment of the invention.

Exemplary embodiments of the invention as described herein generally include systems and methods for image segmentation using continuous-valued Markov Random Fields (MRFs) with probability distributions following the p-norm of the difference between configurations of neighboring sites. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Continuous Valued MRFs for Image Segmentation

An image can be represented by a graph. A weighted undirected combinatorial graph G is defined as a pair G=(V, E) with nodes $i \in V$ and edges $e_{ij} \in E$. An edge that spans two vertices i and j is denoted by $e_{ij}$. Each edge $e_{ij}$ is assigned a non-negative value $w_{ij}$ that is referred to as its weight and it is assumed that $\forall e_{ij} \in E: w_{ij} = w_{ji}$. The neighborhood of a node i is given by all the nodes that it shares an edge with and is denoted by $N_i$. The nodes on the graph typically correspond to pixels in the image and a 4-connected grid is typically used for 2D images, a 6-connected grid is typically used for 3D images, etc. Since the focus is on intensity based segmentation, edge weights are defined as $w_{ij} = \exp(-\beta \|I_i - I_j\|^2)$, where $\beta > 0$ and $I_i$ is the grayscale intensity or RGB color of the node i. One can also use other suitable node-specific image features in order to define the edge weights.

An algorithm according to an embodiment of the invention requires that the foreground/background seed nodes be given interactively or automatically. The set $M \subset V$ contains the locations of the nodes marked as seeds and the set $U \subset V$ contains the locations of the unmarked nodes. The set M is further split into the sets $O \subset M$ and $B \subset M$ that contain the locations of the seeds for the object and the background, respectively. By construction, (a) $M \cap U = \emptyset$, (b) $M \cup U = V$, (c) $O \cap B = \emptyset$, and (d) $O \cup B = M$.

Each node $i \in V$ is associated with a membership $x_i \in [0,1]$. The nodes labeled by the user are assigned membership as $\forall i \in O, x_i = 1$ and $\forall i \in B, x_i = 0$. For the sake of convenience, a membership vector $x \in \Re^{|V|}$, is defined whose $i^{th}$ entry is given by $x_i$. Vectors $x_U = \{x_i\}_{i \in U}$ and $x_M = \{x_i\}_{i \in M}$ are defined that contain the memberships of the unmarked nodes and the marked nodes, respectively. Now, for the purpose of image segmentation, an energy $E_P(x)$ is defined on the graph G as $$E_p(x) = \sum_{e_{ij} \in E} w_{ij} |x_i - x_j|^{p_{ij}}, \tag{1}$$

where $\forall e_{ij} \in E, 1 \leq p_{ij} < \infty$ and $P = \{p_{ij}\}$. Note that this energy function contains terms for pairwise interaction between nodes. However, unary terms can also be accounted for by introducing auxiliary nodes in the graph for the seed nodes and modeling the unary terms as pairwise interactions with these auxiliary nodes. Now, given $E_P(x)$, according to an embodiment of the invention, the memberships of the pixels can be estimated as $$x = \operatorname*{argmin}_x E_p(x) \text{ such that } x_i = 1, \text{ if } i \in O \tag{2}$$

and $x_i = 0$, if $i \in B$.

A framework according to an embodiment of the invention allows different norms for different edges rather than a common norm for all the edges. Since arbitrary values for $p \geq 1$ are being considered, an algorithm according to an embodiment of the invention that solves EQ. (2) will be referred to as a p-brush algorithm.

It is useful to interpret the potential field produced by a p-brush algorithm according to an embodiment of the invention as the maximum a-posteriori (MAP) estimate of a Markov Random Field (MRF) with continuous valued variables, which are given by the memberships x, of the nodes in the graph. The variables at the marked pixels are treated as observed variables such that $\forall i \in O, x_i = 1$ and $\forall i \in B, x_i = 0$. One can define the probability for any configuration x to be given as $$p(x) = \frac{1}{Z} \exp\left(-\sum_{e_{ij} \in E} w_{ij} |x_i - x_j|^{p_{ij}}\right), \tag{3}$$

where Z is the partition constant. Since Z does not depend on x, the MAP estimate of this MRF is given by EQ. (2). It is interesting that Graph Cuts may now also be viewed as optimizing a continuous valued MRF, as opposed to the traditional view of minimization of a binary MRF. Also, for $p_{ij}=2$, a formulation according to an embodiment of the invention corresponds to optimizing a Gaussian MRF, as done by the Random Walker.

Now, note that for the MAP estimate, the membership $x_i$ of an unmarked node $i \in U$ takes the value $$x_i = \underset{x_i}{\operatorname{argmin}}\left(\sum_{j \in N_i} w_{ij}|x_i - x_j|^{p_{ij}}\right). \quad (4)$$

Now, if one assumes that $\forall e_{ij}, w_{ij}=1$ and $p_{ij}=p$, then the membership $x_i$ of an unmarked node $i$ will take the p-average of its neighbors. Specifically, when $p=0, 1, 2$ or $\infty$, then $x_i$ will take the mode, median, mean or minimax value of its neighbors, respectively. If the weights are non-uniform, then the weighted equivalents of these quantities will be determined by each $x_i$. The interpretation of Graph Cuts, Random Walker and shortest paths in terms of the metric average of the potential function of its neighbor allows one to interpret the shrinking bias as the outlier removal of the median (where seeds comprise the outliers) and proximity bias by the over smoothness of the mean and minimax norms. Therefore, fractional values of p (such as p=1.5) may be interpreted as the use of a robust norm to prevent over smoothness while preventing the shrinking bias by allowing the outliers (seeds) to have stronger influence.

Properties of the Solutions

By construction, $E_P(x)$ is a convex continuous function of x, since $\forall e_{ij} \in E, p_{ij} \geq 1$. Therefore, any solution $x^*$ of EQ. (2) must be a global minimizer of $E_P(x)$. The nature of these minimizers will now be characterized. Specifically, one can generalize the maximum (minimum) principle governing elliptical equations in physics to show that $x^*$ must satisfy the property $\forall i \in U, x^*_i \in [0,1]$.

Theorem 1: (Intermediate Value Theorem) Let $x^*$ be a solution to the minimization task of EQ. (2). The membership $x^*_i$ of each unmarked node $i \in U$ is bounded by the maximum and minimum of the memberships $x^*_j$ of the neighboring nodes $j \in N_i$.

Proof: The result is proved by contradiction. Assume that for the given solution $x^*$, there exists an unmarked node $i \in U$ such that $\forall j \in N_i, x^*_j > x^*_i$. Define a new vector $$y^* \in \Re^{|V|} \text{ as } y^*_k = x^*_k \text{ if } k \neq i \text{ and } y^*_i = \max_{j \in N_i} x_j.$$

Now $$E_P(y^*) - E_P(x^*) = \sum_{j \in N_i} w_{ij}((y^*_i - x^*_j)^{p_{ij}} - (x^*_i - x^*_j)^{p_{ij}}) < 0,$$

since $y^*_i < x^*_j$ and $\forall j \in N_i, p_{ij} \geq 1$. This contradicts the fact that $x^*$ is a global minimizer of $E_P(x)$, hence proving that the value of $x^*_i$ is bounded above by the maximum of the memberships $x^*_j$ of the neighboring nodes $j \in N_i$. By a similar argument, one can prove the lower bound of $x^*_i$.

Note that Theorem 1 provides local bounds on the membership of a node based on the memberships of the neighboring nodes. However, Corollary 1 gives a more powerful result which helps determine global bounds on the memberships of all the nodes in the graph.

Corollary 1: (Extremum Value Property) Let $x^*$ be a solution to the minimization task of EQ. (2). The membership $x^*_i$ of each node $i \in V$ satisfies the property:

$$\forall i \in V, \min_{j \in M} x^*_j \leq x^*_i \leq \max_{j \in M} x^*_j. \quad (5)$$

Proof: Assume that the maximum of the memberships $\{x^*_i\}$ is achieved at an unmarked node $j \in U$, i.e. $\forall i \in V, x^*_j \geq x^*_i$. The proof is sketched by the following recursive construction.

1. Define a set $M=\{j\}$. This set will be updated recursively to include the nodes $i \in V$ that satisfy $x^*_i = x^{*j}$.
2. Check if a marked node k is contained in M. The proof is complete if $k \in M$, for some $k \in M$, since it was shown that the maximum value of the memberships is achieved at a marked node. If not, proceed to step 3.
3. Define a set $N_M$ as the neighborhood of all the nodes i contained in M, i.e. $N_M = (\cup_{i \in M} N_i) \setminus M$. There exists at least one node $k \in N_M$ such that $x^*_k = x^*_j$. If not, then by an argument similar to the proof of Theorem 1, one can construct a new vector $y^*$ from $x^*$, such that $$\forall k \in M, y^*_k = \max_{i \in N_M} x^*_i < x^*_j.$$

Then $E_P(y^*) < E_P(x^*)$ contradicts the hypothesis that $x^*$ is a global minimizer of the cost function $E_P(x)$.

4. Append the set M with the node k obtained from step 2 as $M \leftarrow M \cup \{k\}$, and go to step 2.

Note that since $\forall e_{ij} \in E, w_{ij} > 0$, one can find a path between any pair of nodes in the graph defined using a 2N-connected neighborhood, where N is the image grid dimension. Therefore, one has $M \cap M \neq \emptyset$ at some step of the described search strategy according to an embodiment of the invention. A negation of this statement would imply that the search terminates in a set $M \subset U$ that satisfies (a) $(U \setminus M) \cap N_M = \emptyset$, since otherwise an unmarked node from this set would be appended in step 3, and (b) $U \cap N_M = \emptyset$, since it was assumed that the search strategy terminated without finding any marked node in M. These conditions imply that the sets M and $(U \setminus M) \cap M$ are disconnected, contradicting the fully connectedness hypothesis. Similarly, one can prove the result for the minimum value of the memberships too.

Since by construction $\forall i \in O, x_i=1$ and $\forall i \in B, x_i=0$, it may be concluded from Corollary 1 that the membership $x_i$ of each unmarked node $i \in U$ takes values in [0, 1]. As a result, the set of solutions for the potentials at the unmarked nodes $x_U$ is $[0, 1]^{|U|}$, which is a compact and convex set. This result coupled with the fact that the energy function $E_P(x)$ is convex in x, allows one to adopt any descent algorithm in order to estimate the minimizer of $E_P(x)$. Since the estimated membership $x_i$ of each unmarked node $i \in U$ lies in [0, 1], one can estimate the segmentation by placing a decision threshold at $x=0.5$.

Now, a result which will assist in the convergence analysis of an iterative solver for $x^*$ will be derived.

Theorem 2: (Right continuity in the norms $P=\{p_{ij}\}$) Define $x^*_{P+\epsilon}$ as a minimizer of $E_{P+\epsilon}(x)$, where $P+\epsilon=\{p_{ij}+\epsilon\}_{e_{ij} \in E}$, $\epsilon \geq 0$. Then $x^*_{P+\epsilon}$ is right continuous in the entries of P, i.e.

$$\lim_{\epsilon \to 0} x^*_{P+\epsilon} = x^*_P. \quad (6)$$

Proof: By definition, $E_P(x^*_P) \leq E_P(x^*_{P+\epsilon})$ and $E_{P+\epsilon}(x^*_{P+\epsilon}) \leq E_{P+\epsilon}(x^*_P)$. For the sake of notational convenience, $a^*=x^*_P$ and $b^*=x^*_{P+\epsilon}$. Now, from Corollary 1, it is known that $\forall i \in V$, $0 \leq a^*_i \leq 1$. Therefore, one can conclude that $\forall e_{ij} \in E, |a^*_i - a^*_j| \in$

[0,1], and hence $\forall \epsilon > 0, \forall e_{ij} \in E, |a^*_i - a^*_j|^{p_{ij}+\epsilon} \leq |a^*_i - a^*_j|^{p_{ij}}$. As a consequence, one has the result that $E_{P+\epsilon}(x^*_P) \leq E_{P+\epsilon}(x^*_{P+\epsilon})$.

The above results gives the relationship $$E_{P+E}(x^*_{P+E}) \leq E_{P+E}(x^*_P) \leq E_P(x^*_P) \leq E_P(x^*_{P+\phi}). \quad (7)$$

Note that the term $$E_{P+\epsilon}(x^*_{P+\epsilon}) - E_P(x^*_{P+\epsilon}) = \Sigma_{e_{ij} \in E} w_{ij} |b^*_i - b^*_j|^{p_{ij}} (1 - |b^*_i - b^*_j|^\epsilon)$$

is non-negative as per EQ. (7). In what follows, an upper bound is attained for this term, by finding the upper bound of $z^p - z^{p+\epsilon}$, $p \geq 0, \epsilon \geq 0$ under the constraint that $z \geq 0$. In particular, one can find a $z^* > 0$ at which the derivative of $z^p - z^{p+\epsilon}$ vanishes:

$$\left. \frac{\partial(z^p - z^{p+\epsilon})}{\partial z} \right|_{z=z^*} = \quad (8)$$

$$pz^{*p-1} - (p+\epsilon)z^{*p+\epsilon-1} = 0 \Rightarrow z^* = \left(\frac{p}{p+\epsilon}\right)^{1/\epsilon} \in (0,1).$$

It can be checked that the second derivative at $z=z^*$ is negative, therefore establishing that $z^p - z^{p+\epsilon}$ attains its maximum value of $$\frac{\epsilon}{p+\epsilon}\left(\frac{p}{p+\epsilon}\right)^{p/\epsilon}$$

at $z=z^*$ (given by EQ. (8)). This implies that $$0 \leq E_{P+\epsilon}(x^*_{P+\epsilon}) - E_P(x^*_{P+\epsilon}) =$$

$$\sum_{e_{ij} \in E} w_{ij} [|b^*_i - b^*_j|^{p_{ij}} - |b^*_i - b^*_j|^{p+\epsilon}|] \leq \epsilon \sum_{e_{ij} \in E} w_{ij}.$$

Note that this is only a weak bound, but suffices for the purpose of this proof.

Therefore as $\epsilon \to 0$, one has that $(E_{P+\epsilon}(x^*_{P+\epsilon}) - E_P(x^*_{P+\epsilon})) \to 0$, and hence by EQ. (7), $(E_P(x^*_{P+\epsilon}) - E_P(x^*_{P+\epsilon})) \to 0$. Since $E_P(x)$ is continuous in x, one can conclude that as $\epsilon \to 0$, $(x^*_{P+\epsilon} - x^*_P) \to 0$, and hence the required result.

Energy Minimization

According to an embodiment of the invention, EQ. (2) can be solved by an iterative solver, the Iterative Reweighted Least Squares technique. Before proceeding, it is useful to formally define some terms that shall be used. Given the weights $\{w_{ij}\}$ for a graph G, define a weights matrix $W \in \Re^{|V| \times |V|}$, whose (i, j) entry is given by $w_{ij}$ if $e_{ij} \in E$ and 0 otherwise. The matrix W can be used to define a diagonal matrix $D \in \Re^{|V| \times |V|}$, whose $i^{th}$ diagonal entry is given by $$\sum_{j=1}^{|V|} w_{ij}.$$

Finally, define a Laplacian matrix $L(W) \in \Re^{|V| \times |V|}$ as $L(W)=D-W$. By this definition, $$L_{ij} = \begin{cases} -w_{ij}, & \text{if } i \neq j, e_{ij} \in E, \\ 0, & \text{if } i \neq j, e_{ij} \notin E, \\ \sum_{j=1, j \neq i}^{|V|} w_{ij}, & \text{if } i = j, \end{cases}$$

and $E_P(x) = x^T L(W) x$. Note that by construction of $L(W)$, there is for any vector $x \in \Re^{|V|}$, $x^T L(W) x = \Sigma_{e_{ij} \in E} w_{ij} (x_i - x_j)^2$. Therefore, if $\forall e_{ij} \in E$, $w_{ij} > 0$, then $L(W)$ is a positive-semi definite matrix with the only null vector being the vector with all entries equal to 1. One can also decompose the matrix $L(W)$ into matrices such that $$x^T L(W) x = \begin{bmatrix} x_U & x_M \end{bmatrix} \begin{bmatrix} L_U(W) & B(W) \\ B^T(W) & L_M(W) \end{bmatrix} \begin{bmatrix} x_U \\ x_M \end{bmatrix}, \quad (9)$$

Figure 9:
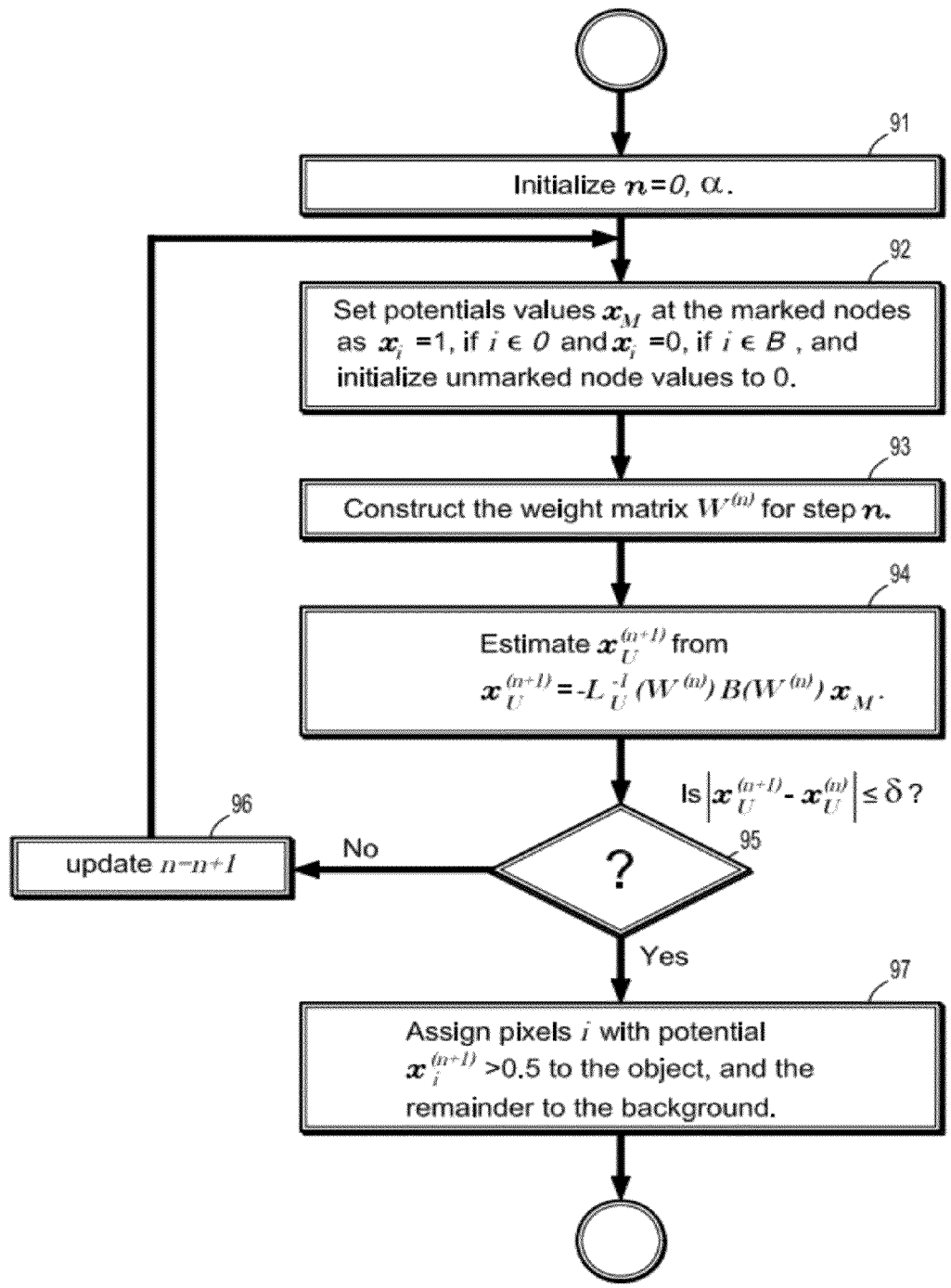
FIG. 9 is a flow chart of a method for image segmentation using continuous-valued Markov Random Fields (MRFs) with probability distributions following the p-norm of the difference between configurations of neighboring sites, according to an embodiment of the invention.

Given these definitions, $E_P(x)$ can be minimized subject to the user specified constraints by using an algorithm according to an embodiment of the invention presented in the flowchart of FIG. 9. Referring now to the figure, an algorithm according to an embodiment of the invention begins at step 91 by setting n=0 and choosing a value $\alpha > 0$. At step 92, the values of the potentials $x_M$ are set at the marked nodes as $x_i=1$, if $i \in O$ and $x_i=0$, if $i \in B$. The values of the potentials are initialized at the unmarked nodes by setting them to 0, i.e. $x_U^{(0)}=0$. At step 93, the weight matrix $W^{(n)}$ for step n is constructed as $$W_{ij}^{(n)} = \begin{cases} p_{ij} w_{ij} |x_i^{(n)} - x_j^{(n)}|^{p_{ij}-2} & \text{if } e_{ij} \in E, x_i^{(n)} \neq x_j^{(n)}, \\ \alpha^{p_{ij}-2} & \text{if } e_{ij} \in E, x_i = x_j, \\ 0 & \text{otherwise.} \end{cases} \quad (10)$$

At step 94, the minimizer $x^T L(W^{(n)}) x$ of $x_U^{(n+1)}$ is estimated from $x_U^{(n+1)} = -L_U^{-1}(W^{(n)}) B(W^{(n)}) x_M$. At step 95, convergence is checked: if $|x_U^{(n+1)} - x_U^{(n)}| > \delta$, update n=n+1 at step 96 and return to step 92, otherwise, at step 97, pixels i with potential $x_i^{(n+1)} > 0.5$ are assigned to the object, and the remaining pixels are assigned to the background.

It will now be shown that this iterative scheme descends the energy function, therefore outlining a proof of convergence. The analysis will be separated into the cases (a) $\forall e_{ij} \in E, p_{ij} > 1$ and (b) $\forall e_{ij} \in E, p_{ij} \geq 1$. The reason for separating the analysis in this case is that for case (a), the function $E_P(x)$ is differentiable and hence it can be proven that an algorithm according to an embodiment of the invention follows a framework similar to Newton descent. For the case (b), $E_P(x)$ might not be differentiable. However, it is equivalent to the limit of the solutions given by a series of several algorithms that descend $E_P(x)$.

Case (a): $\forall e_{ij} \in E, p_{ij} > 1$: Note that the gradient of $E_P(x)$ exists and is given as $$\frac{\partial E_P(x)}{\partial x_U} = L_U(W) x_U + B(W) x_M. \quad (11)$$

Observe that the update vector at the $n^{th}$ step in the algorithm of FIG. 9 is $\Delta x_U^{(n)} = x_U^{(n+1)} - x_U^{(n)}$, which can be rewritten as $$\Delta x_U^{(n)} = -L_U^{-1}(W^{(n)})B(W^{(n)})x_M - x_U^{(n)} \qquad (12)$$

$$= -L_U^{-1}(W^{(n)})[L_U(W^{(n)})x_U^{(n)} + B(W^{(n)})x_M]$$

$$= -L_U^{-1}(W^{(n)})\frac{\partial E_P()}{\partial x_U}.$$

Also, since $\forall e_{ij} \in E, W_{ij}^{(n)} > 1$, one can conclude that $L_U(W(W^{(n)}))$ is a positive definite matrix. Therefore, $\Delta x_U^{(n)}$ is a descent direction at $x_U = x_U^{(n)}$, since $$\Delta x_U^{(n)} = -H\frac{\partial E_P(x^{(n)})}{\partial x_U}$$

is a descent direction for any positive definite H. Note that if $\forall e_{ij} \in E, p_{ij} = p > 1$, then $(p-1)L_U(W)$ corresponds to the Hessian of $E_P(x)$. In this case, a method according to an embodiment of the invention is equivalent to a Newton descent algorithm with a modified step size of (p−1) rather than 1. If the norms vary across the edges, the matrix $L_U(W)$ is not equal to the Hessian of $E_P(x)$, then the update is a descent direction different from the Newton descent direction.

Case (b): $\forall e_{ij} \in E, p_{ij} \geq 1$: Recall from Theorem 2 that the minimizers of $E_P(x)$ are right continuous with respect to the norms in P. Now, consider an energy function $E_P(x)$ such that for some edges $e_{ij} \in E$, the associated noun $p_{ij} = 1$. According to an embodiment of the invention, the minimizer of $E_{P+\epsilon}(x)$ can be estimated using the algorithm of FIG. 9, which as shown in case (a), provably converges to the minimizer $x^*_{P+\epsilon}$. Therefore, by choosing $\epsilon$ as small as possible, one can estimate $x^*_P$ with desired accuracy. As a result, the minimization can be seen as the limit of the results of several descent algorithms.

Note that in EQ. (10), the weight is defined as $W_{ij}^{(n)} = \alpha_{ij}^{p_{ij}-2}$ when $x_i = x_j$. This ensures that the inversion of $L_U(W^{(n)})$ in step 94 of FIG. 9 is well-conditioned. In the experiments presented below, a value of $\alpha \cong 10^{-6}$ was used. Smaller values of $\alpha$ can result in the inversion still being ill-conditioned. Larger values of $\alpha$ do not accurately represent the condition $x_i = x_j$ and can hence result in a slow convergence.

Testing on Synthetic Images

Variants of an algorithm according to an embodiment of the invention were tested on a variety of synthetic and real 2-dimensional (2D) images. It is to be understood, however, the use of 2D images is exemplary and non-limiting and is for simplicity only, and that methods according to an embodiment of the invention are applicable to scalar or vector valued images defined on grids of arbitrary dimension, or even for images defined on pixel collections not organized into a grid, such as ultra-sound images.

FIGS. 1(a)-(b) illustrate test results of algorithms according to embodiments of the invention on a diagonal line image, shown in FIG. 1(a), to illustrate various positive/negative aspects of different algorithms. First, the effect of an increasing p value on the metrication (pixelation) error was examined. When p=1, the minimum cut is degenerate in this synthetic image, as shown in FIG. 1(b). Traditional maximum flow algorithms typically find a "squared off" cut. However, an iterative method according to an embodiment of the invention gives continuous values which may be thresholded at p=0.5 to produce the desired smooth, diagonal cut.

Figure 2:
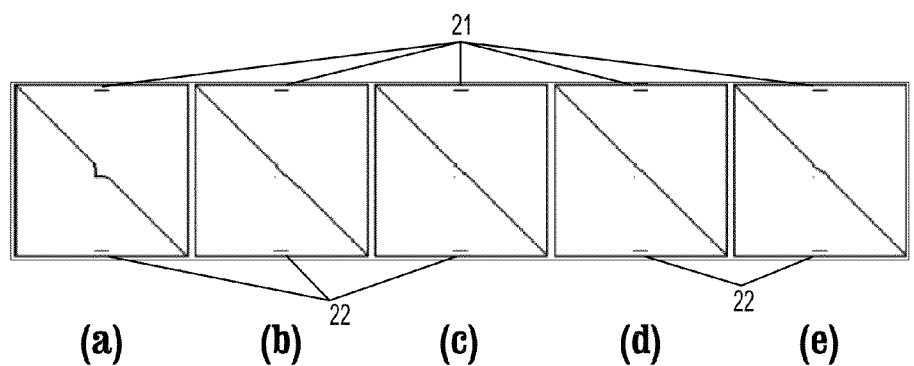
FIGS. 2(a)-(e) depict the effect of breaking the degeneracy by modifying the image to include a single speck in the ambiguous region, according to an embodiment of the invention.

If the degeneracy is broken by modifying the image to include a single speck in the ambiguous region, the "squared off" metrication effect is seen once again. These results are exhibited in FIGS. 2(a)-(e), which shows the results of increasing the value of p from 1.05 to 3.0 to observe the transition between the blocky p=1 case and the smooth p=2 case. FIGS. 2(a), (b), (c), (d), and (e) correspond to, respectively, p values of 1.05, 1.1, 1.5, 2.0, and 3.0. The foreground and background seeds are indicated by reference numbers 22 and 21, respectively. The segmentation boundary estimated by the algorithm is the diagonal line bisecting the figure. Note that the metrication error disappears for values of p≧1.5, FIGS. 2(c)-(e). The Random Walker (p=2, FIG. 2(d)) still finds the smoother diagonal cut. When p is pushed above p=2, the solution begins to resemble the distance-based boundary for the p=1 case.

Figure 3:
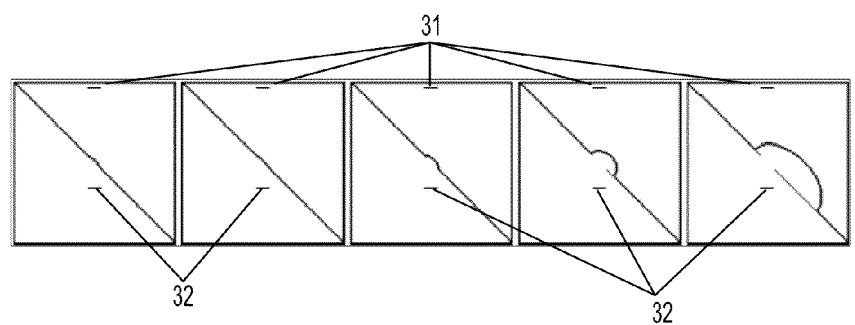
FIGS. 3(a)-(e) depict the effect of increasing p on the proximity bias, according to an embodiment of the invention.

Next, the effect of p on the proximity bias known to occur for Random Walker (p=2) was examined. In this case, it is known previously that for Graph Cuts (p=1), there should be no dependency on seed location within either the upper or lower region. FIGS. 3(a)-(e) illustrates how intermediate values of p affect this bias. FIGS. 3(a), (b), (c), (d), and (e) correspond to, respectively, p values of 1.05, 1.1, 1.5, 2.0, and 3.0. The foreground and background seeds are indicated by reference numbers 32 and 31, respectively. The segmentation boundary estimated by the algorithm is the diagonal across the figure. Note that the "bulge" effect of the Random Walker is avoided for p≦1.5.

Figure 4:
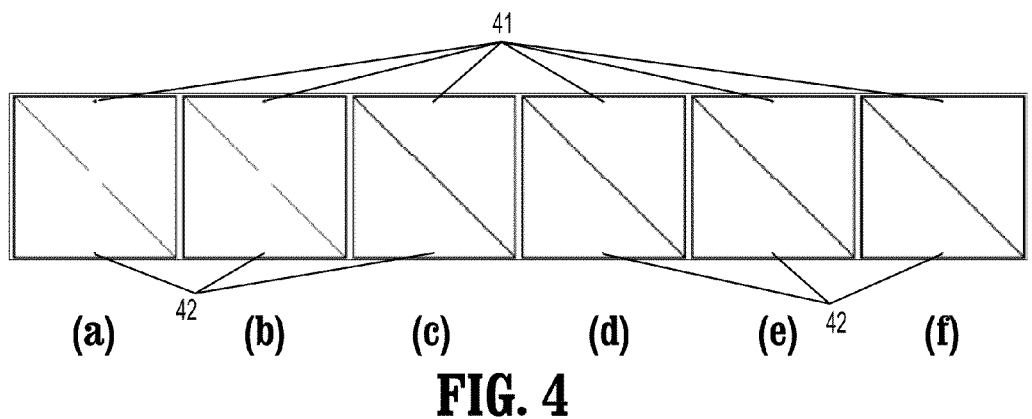
FIGS. 4(a)-(f) depict the effect of varying p between 1 and 2 to determine when the shrinking bias disappears, according to an embodiment of the invention.
Figure 5:
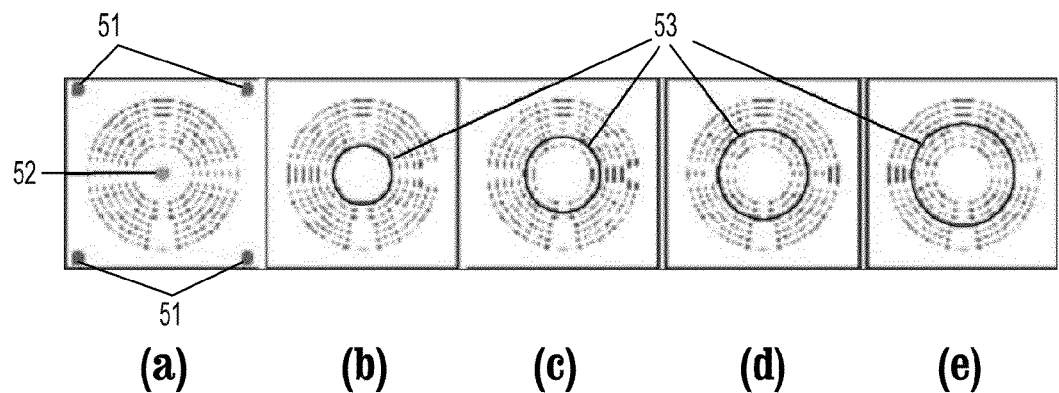
FIGS. 5(a)-(e) further probe the shrinking bias, according to an embodiment of the invention.

Next, the shrinking bias for various p values is examined. Given a single seed and a weak boundary, Graph Cuts produces a segmentation that minimally surrounds the seed while the Random Walker algorithm will avoid this problem. A question of interest is: at what value of p does the shrinking bias disappear? FIGS. 4(a)-(f) shows the segmentations obtained for various values of p. FIGS. 4(a), (b), (c), (d), (e), and (f) correspond to, respectively, p values of 1.0, 1.1, 1.2, 1.5, 1.75, and 2.0. The foreground and background seeds are indicated by reference numbers 42 and 41, respectively. The segmentation boundary estimated by the algorithm is the diagonal line bisecting the figure. Note that the shrinking bias is removed quickly as p increases, and in this case, is gone after p≧1.2. The shrinking bias is further illustrated in FIGS. 5(a)-(e), on an image with concentric circles. FIGS. 5(a), (b), (c), (d), and (e) illustrate, respectively, the image and seeds, the p=1 boundary, the p=1.5 boundary, the p=2 boundary, and the p=2.9 boundary. The foreground and background seeds are indicated by reference numbers the p=1 boundary 52 and 51, respectively. The segmentation boundary estimated by the algorithm is the overlaid circle 53. Since the shrinking bias is largest for smaller values of p, the boundary is placed at the inner most circle for p=1. As one increases p, the shrinking bias reduces and the segmentation boundary moves towards the outer circle. Interestingly, even when the value of p is increased to be ≧3, the segmentation boundary cannot be produced beyond the midpoint circle since the solution approaches the shortest paths solution, which depends only on the number of circles necessary to cross over to the foreground from the background.

These tests on synthetic examples indicate that that the effects of Graph Cuts (shrinking bias and metrication) and Random Walker (proximity bias) can both be avoided by using an intermediate value of p, such as 1.25≦p≦1.5, which produces a hybrid algorithm that does not experience the effects of either algorithm.

Testing on Real Images

Algorithms according to mother embodiments of the invention were applied with varying p to the set of images in the Microsoft "GrabCut" database. The database contains ground truth segmentations for 50 color images corresponding to indoor as well as outdoor scenes. A 4-connected lattice and the Euclidean distances of the RGB values of these color images were used to set image weights. No unary (data) terms were used. In the experiments, two different seeding strategies were used. In the first case, the seeds provided in the database itself were used, obtained by eroding the ground truth segmentation. Since such scribbles are favorable for distance based segmentation schemes, a new set of scribbles was also considered. The scribbles for the background are taken as the rectangular bounding boxes provided by the database. The object's skeleton was dilated and used as a scribble for the object.

Segmentation was estimated using different values of p, and the same graph/weights were used for all values of p. Note that the p=1 case was produced using a Graph Cuts implementation rather than an IRLS algorithm according to an embodiment of the invention. The error in the results was quantified using four different standard segmentation measures, namely Boundary Error (BE), Rand Index (RI), Global Consistency Error (GCE), and Variation of Information (VoI). Good segmentation quality is marked by low BE, high RI, low GCE and low VoI. Results of this test of segmentation quality are given in Tables 1 and 2, shown in FIG. 8. From these segmentation measures, one can produce a rank for each p value with respect to its performance for each metric, and compute an average rank (Avg. rank in the tables) by taking the average of the ranks for different metrics.

Figure 6:
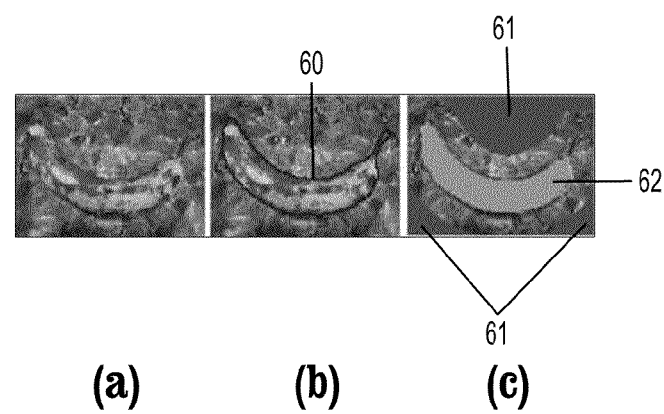
FIGS. 6(a)-(f) depict examples of testing using the native GrabCut seeds, according to an embodiment of the invention.
Figures 7, 8:
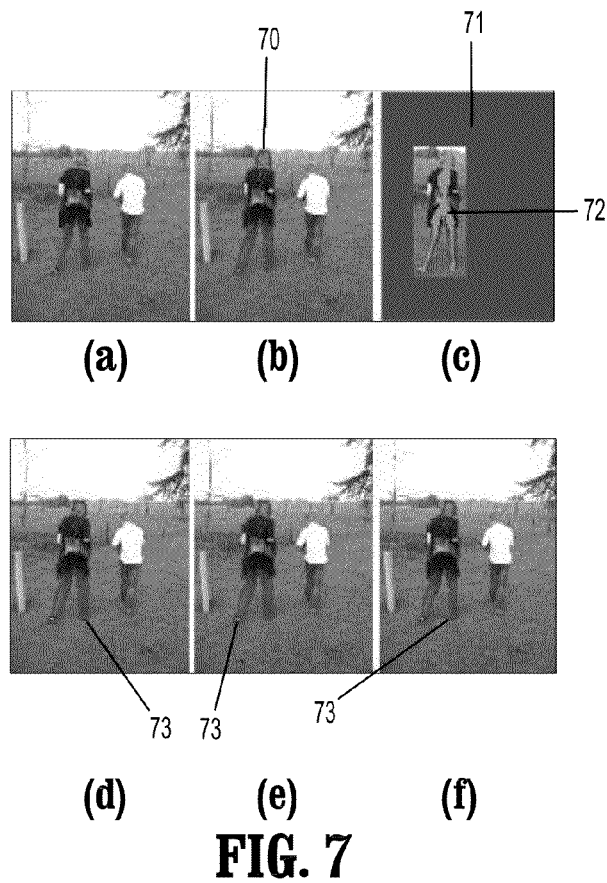
FIG. 8 are tables presenting mean errors for different sets of scribbles, according to an embodiment of the invention.

FIGS. 6(a)-(f) and 7(a)-(f) show typical results obtained in this analysis, with FIG. 6 depicting results of using eroded ground truth as scribbles, and FIG. 7 depicting results of using the rectangle/skeleton as scribbles. For each of FIGS. 6 and 7, the (a) figure depicts the image, the (b) figure depicts the true boundary, the (c) figure depicts the scribbles, the (d) figure depicts the p=1 boundary, the (e) figure depicts the p=1.5 boundary, and the (f) figure depicts the p=2 boundary. The true boundary in the (b) figures is indicated by reference numbers 60, 70, the seeds in the (c) figures are indicated by reference numbers 61, 71, and 62, 72 for the foreground and background respectively, and the segmentation boundaries are indicated by reference numbers 63, 73. In FIG. 6, the Graph Cuts (p=1) case shows shrinking bias and misses the tip of the banana. This effect is not present in the cases of p=1.5 and p=2, the Random Walker case. In FIG. 7, the Random Walker (p=2) case is sensitive to the scribble near the woman's leg. This is not so for the cases of p=1 (Graph Cuts) and p=1.5. As expected, it may be seen that the first seeding scenario (native to the database, FIG. 6) results in segmentation errors that improve as one increases the value of p. This is because proximity bias tends to increase with the value of p. In the second seeding scheme (FIG. 7), the results are better for lower values of p because the seed locations are poor indicators of the desired segmentation boundary. However, note that across both seeding schemes, the quality score of p=1.5 indicates a desirable tradeoff between the Graph Cuts (p=1) and Random Walker (p=2) cases. One can always choose Graph Cuts or the Random Walker if one is aware of the seeding schemes that are going to be employed in a particular application. However, from the point of a general interactive segmentation algorithm, a p-brush algorithm according to an embodiment of the invention with p=1.5 has the best rank on average across seeding strategies.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 10:
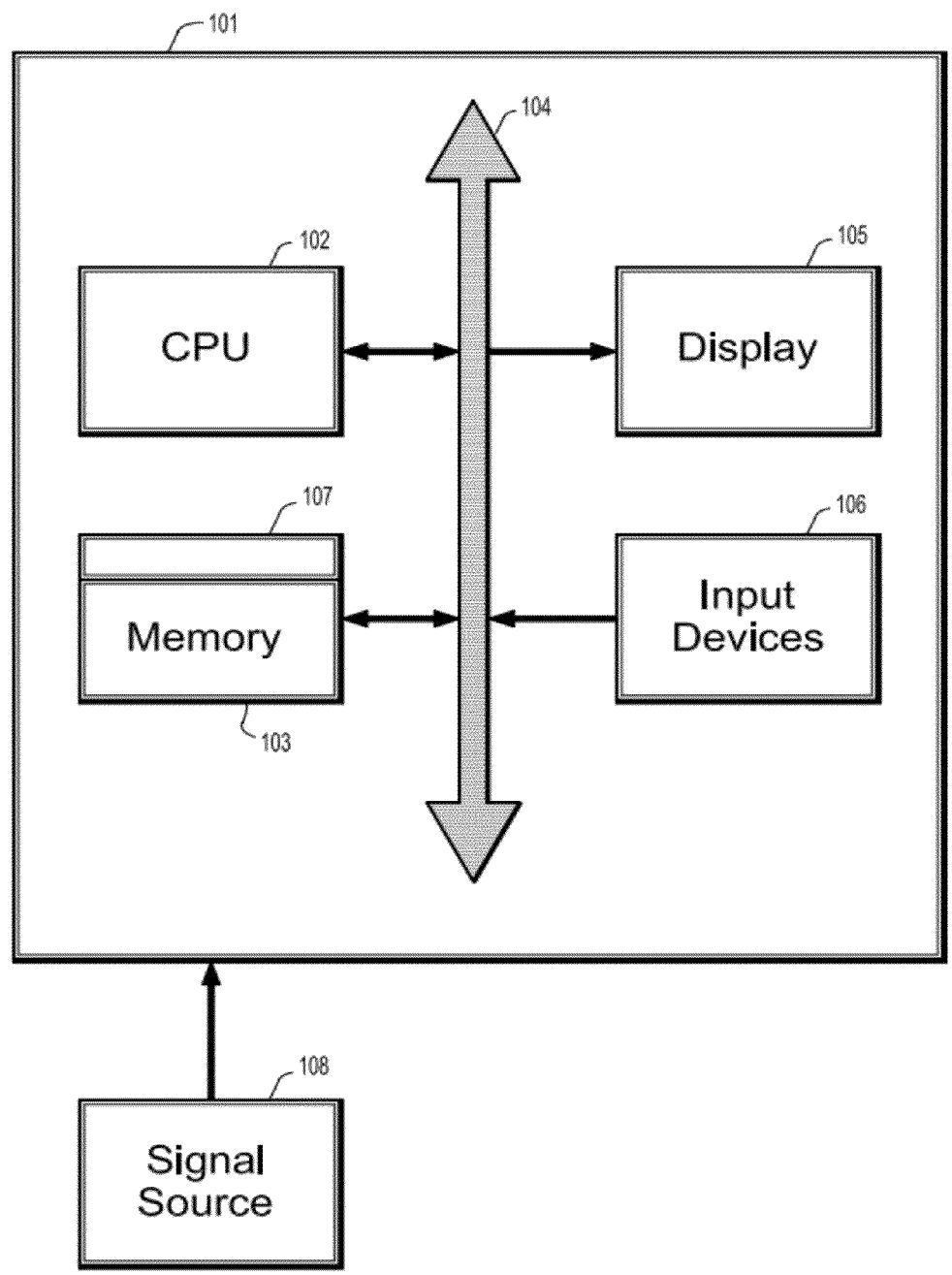
FIG. 10 is a block diagram of an exemplary computer system for implementing a method for image segmentation using continuous-valued Markov Random Fields (MRFs) with probability distributions following the p-norm of the difference between configurations of neighboring sites, according to an embodiment of the invention.

FIG. 10 is a block diagram of an exemplary computer system for implementing a method for image segmentation using continuous-valued Markov Random Fields (MRFs) with probability distributions following the p-norm of the difference between configurations of neighboring sites, according to an embodiment of the invention. Referring now to FIG. 10, a computer system 101 for implementing the present invention can comprise, inter alia, a central processing unit (CPU) 102, a memory 103 and an input/output (110) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method for segmenting a digital image, the method performed by the computer comprising the steps of:

initializing object and background seed nodes in an image, wherein the image is represented as a graph G=(V, E) whose nodes i∈V correspond to image points and whose edges e∈E connect adjacent points, wherein set M ⊂ V contains locations of nodes marked as seeds, set U ⊂ V contains locations of unmarked nodes, set O ⊂ M contains locations of object seed nodes, and set B ⊂ M contains locations of background seed nodes;

assigning to each seed node a membership value such that $\forall i \in O, x_i=1$ and $\forall i \in B, x_i=0$, wherein each node i∈V is associated with a membership $x_i \in [0,1]$; and finding a membership vector $x \in \Re^{|V|}$, whose $i^{th}$ entry is given by $x_i$ that minimizes $$E_p(x) = \sum_{e_{ij} \in E} w_{ij}|x_i - x_j|^{p_{ij}},$$

wherein each edge $e_{ij} \in E$ connecting nodes i and j in V is associated with a weight $w_{ij}$ and an exponent $p_{ij}$, and $\forall e_{ij} \in E$, $1 \leq p_{ij} < \infty$ such that $x_i=1$ if $i \in O$ and $x_i=0$ if $i \in B$
wherein $E_p(x)$ is an energy of a weighted graph formed by a function associated to nodes x, $e_{ij} \in E$ are edges in a weighted graph between nodes i and j, $w_{ij}$ is a weight of an edge $e_{ij}$, and $x_i$ and $x_j$ are the values of node i and node j, respectively; and
generating an image that contains a segmentation of the object according to the membership value.

2. The method of claim 1, wherein the membership $x_i$ of an unmarked node $i \in U$ takes the value $$x_i = \arg\min_{x_i}\left(\sum_{j \in N_i} w_{ij}|x_i - x_j|^{p_{ij}}\right),$$

wherein $N_i$ is a set of all nodes j that share an edge $e_{ij}$ with node i.

3. The method of claim 1, wherein said image comprises a plurality of intensities associated with an N-dimensional grid of points.

4. The method of claim 1, wherein said image comprises a plurality of vectors associated with an N-dimensional grid of points.

5. The method of claim 1, wherein said image comprises a plurality of intensities associated with collection of points.

6. The method of claim 1, wherein $$E_p(x) = \sum_{e_{ij} \in E} w_{ij}|x_i - x_j|^{p_{ij}}$$

is minimized using an iteratively reweighted least squares algorithm.

7. The method of claim 1, wherein nodes i with potential $x_i > 0.5$ are assigned to the object, and the remaining to background.

8. A program storage device readable by a computer, tangibly embodying a program of instructions executable by the computer to perform the method steps for segmenting a digital image, the method comprising the steps of:
initializing object and background seed nodes in an image, wherein the image is represented as a graph G=(V, E) whose nodes $i \in V$ correspond to image points and whose edges $e \in E$ connect adjacent points, wherein set $M \subset V$ contains locations of nodes marked as seeds, set $U \subset V$ contains locations of unmarked nodes, set $O \subset M$ contains locations of object seed nodes, and set $B \subset M$ contains locations of background seed nodes;
assigning to each seed node a membership value such that $\forall i \in O, x_i = 1$ and $\forall i \in B, x_i = 0$, wherein each node $i \in V$ is associated with a membership $x_i \in [0,1]$; and
finding a membership vector $x \in \Re^{|V|}$, whose $i^{th}$ entry is given by $x_i$ that minimizes $$E_p(x) = \sum_{e_{ij} \in E} w_{ij}|x_i - x_j|^{p_{ij}},$$

wherein each edge $e_{ij} \in E$ connecting nodes i and j in V is associated with a weight $w_{ij}$ and an exponent $p_{ij}$, and $\forall e_{ij} \in E$, $1 \leq p_{ij} < \infty$, such that $x_i=1$ if $i \in O$ and $x_i=0$ if $i \in B$
wherein $E(x)$ is an energy of a weighted graph formed by a function associated to nodes x, $e_{ij} \in E$ are edges in a weighted graph between nodes i and j, $w_{ij}$ is a weight of an edge $e_{ij}$, and $x_i$ and $x_j$ are the values of node i and node j, respectively; and
generating an image that contains a segmentation of the object according to the membership value.

9. The computer readable program storage device of claim 8, wherein the membership $x_i$ of an unmarked node $i \in U$ takes the value $$x_i = \arg\min_{x_i}\left(\sum_{j \in N_i} w_{ij}|x_i - x_j|^{p_{ij}}\right),$$

wherein $N_i$ is a set of all nodes j that share an edge $e_{ij}$ with node i.

10. The computer readable program storage device of claim 8, wherein said image comprises a plurality of intensities associated with an N-dimensional grid of points.

11. The computer readable program storage device of claim 8, wherein said image comprises a plurality of vectors associated with an N-dimensional grid of points.

12. The computer readable program storage device of claim 8, wherein said image comprises a plurality of intensities associated with collection of points.

13. The computer readable program storage device of claim 8, wherein $$E_p(x) = \sum_{e_{ij} \in E} w_{ij}|x_i - x_j|^{p_{ij}}$$

is minimized using an iteratively reweighted least squares algorithm.

14. The computer readable program storage device of claim 8, wherein nodes i with potential $x_i > 0.5$ are assigned to the object, and the remaining to background.

\* \* \* \* \*